United States Patent
Mizuguchi et al.

(10) Patent No.: US 7,105,046 B2
(45) Date of Patent: *Sep. 12, 2006

(54) BLACK PERYLENE PIGMENT AND PROCESS FOR PRODUCING THE SAME

(75) Inventors: Jin Mizuguchi, Yokohama (JP); Nobuya Shimo, Ohtake (JP)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/484,639

(22) PCT Filed: Jul. 26, 2002

(86) PCT No.: PCT/JP02/07602

§ 371 (c)(1), (2), (4) Date: Sep. 2, 2004

(87) PCT Pub. No.: WO03/010241

PCT Pub. Date: Feb. 6, 2003

(65) Prior Publication Data

US 2005/0016420 A1    Jan. 27, 2005

(30) Foreign Application Priority Data

Jul. 27, 2001 (JP) ............................. 2001-227694

(51) Int. Cl.
 *C09B 67/20* (2006.01)
 *C09B 5/20* (2006.01)

(52) U.S. Cl. ........................................ 106/498; 546/37
(58) Field of Classification Search ................ 106/498; 546/37

See application file for complete search history.

(56) References Cited

U.S. PATENT DOCUMENTS

| | | | |
|---|---|---|---|
| 3,554,776 A | | 1/1971 | Gerson et al. |
| 3,972,717 A | | 8/1976 | Wiedemann |
| 4,742,170 A | * | 5/1988 | Spietschka et al. ............ 546/37 |
| 4,769,460 A | * | 9/1988 | Spietschka et al. ............ 546/37 |
| 4,882,254 A | * | 11/1989 | Loutfy et al. ............... 430/58.8 |
| 5,141,837 A | * | 8/1992 | Nguyen et al. .............. 430/135 |
| 5,154,770 A | * | 10/1992 | Spietschka et al. ......... 106/498 |
| 5,247,088 A | * | 9/1993 | Flatt ........................... 546/37 |
| 6,165,661 A | * | 12/2000 | Hsiao et al. ............... 430/58.8 |
| 6,322,941 B1 | * | 11/2001 | Hsiao et al. .............. 430/58.65 |
| 6,464,902 B1 | * | 10/2002 | Gaynor et al. .............. 252/600 |
| 2004/0255821 A1 | * | 12/2004 | Mizuguchi et al. ......... 106/493 |

FOREIGN PATENT DOCUMENTS

| | | |
|---|---|---|
| EP | 0 209 403 | 1/1987 |
| EP | 209403 A2 | 1/1987 |
| EP | 0 554 110 A1 | 8/1993 |
| JP | 62-223272 A | 10/1987 |

* cited by examiner

*Primary Examiner*—Anthony J. Green
(74) *Attorney, Agent, or Firm*—Nixon & Vanderhye, P.C.

(57) ABSTRACT

A black perylene-based pigment produced by calcining at least one compound selected from the group consisting of diimide derivatives of perylene tetracarboxylic acid and diimide derivatives of perylene diiminodicarboxylic acid, at a temperature of 200 to 600° C. in vacuum or in an inert gas atmosphere, exhibits an excellent blackness, an excellent heat resistance and an excellent weather fastness as well as a high resistance and a high safety.

2 Claims, 2 Drawing Sheets

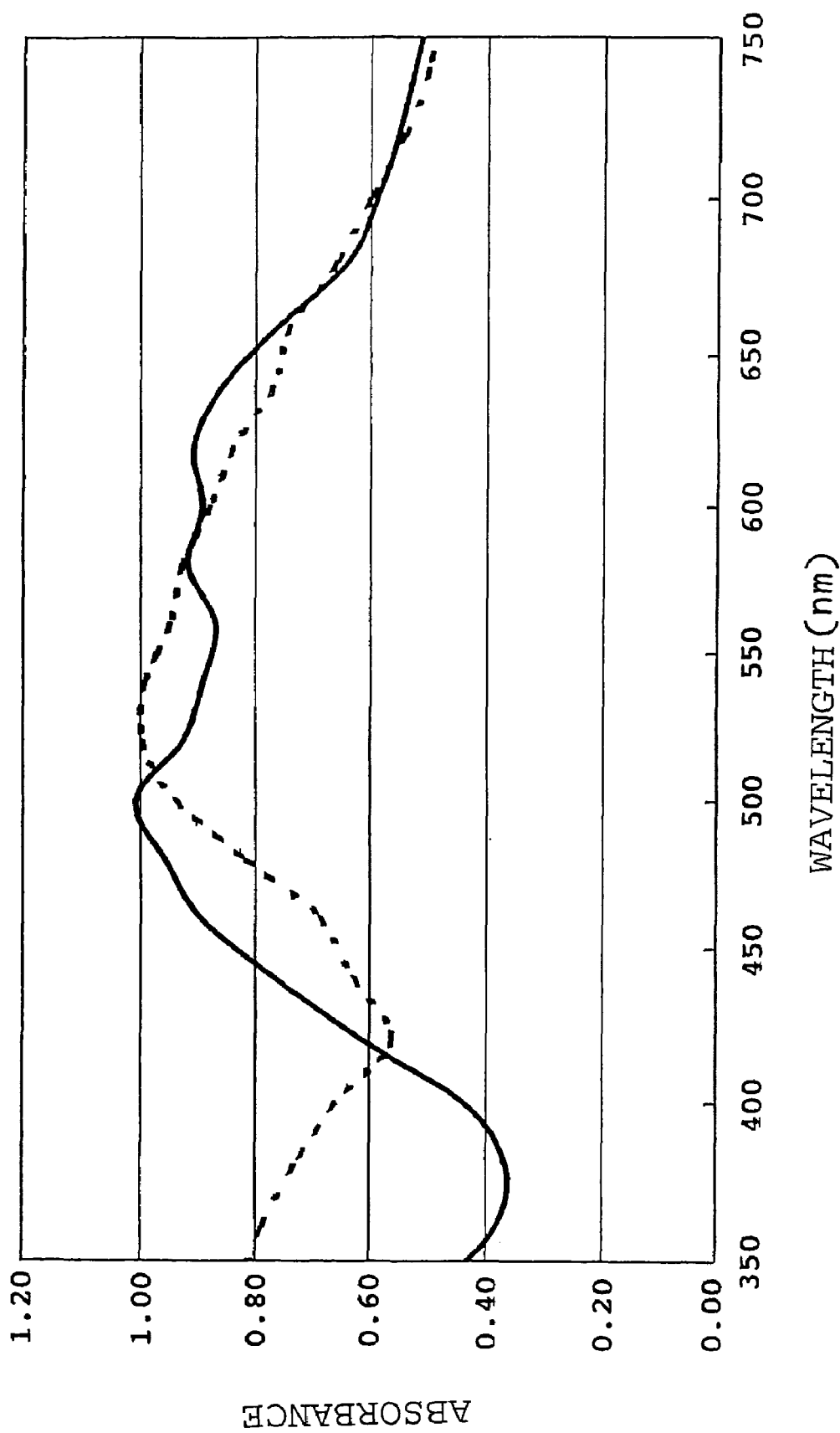

BLACK PERYLENE PIGMENT AND PROCESS FOR PRODUCING THE SAME

This application is the US national phase of international application PCT/JP02/07602, filed 26 Jul. 2002, which designated the US. PCT/JP02/07602 claims priority to JP Application No. 2001-227694 filed 27 Jul. 2001. The entire contents of these applications are incorporated herein by reference.

TECHNICAL FIELD

The present invention relates to a black perylene-based pigment and a process for producing the same, and more particularly, to a black perylene-based pigment having a high blackness, a high tinctorial strength, an excellent heat resistance and an excellent weather fastness as well as a high safety and a high electrical resistance, and a process for producing such a black perylene-based pigment. The black perylene-based pigment of the present invention is useful as coloring pigments for inks, paints, ink-jet printing inks, electrophotographic toners, rubbers and plastics, black matrix pigments for liquid crystal color filters, etc.

BACKGROUND ART

As black pigments, there have been conventionally used carbon black, perylene-based pigments and the like. Among these black pigments, carbon black has been most widely used because of its high tinctorial strength as well as an excellent blackness, an excellent acid resistance and an excellent weather fastness. However, carbon black has a very small particle size and a large bulk density and, therefore, tends to suffer from problems such as poor handling property and workability. Also, it may be difficult to use such carbon black in applications requiring a high electrical resistance, such as black matrix materials for liquid crystal color filters, because of a low electrical resistance thereof. Further, the carbon black may contain carcinogenic polycyclic condensation compounds and, therefore, has a problem concerning a safety.

Although the perylene-based pigments extensively used as fast pigments exhibit red-violet-brown-black colors in a solid state, the color tone thereof is not necessarily kept thermally stable (W. Herbst & K. Hunger "Industrial Organic Pigments", VCH Press, pp. 467–480).

An object of the present invention is to provide a black perylene-based pigment exhibiting an excellent blackness, an excellent heat resistance and an excellent weather fastness as well as a high safety, which is usable as black matrix pigments for liquid crystal color filters.

BRIEF DESCRIPTION OF THE DRAWINGS

FIG. 2 is a graph showing a light absorption spectrum of the black pigment obtained in Example 1.

DISCLOSURE OF THE INVENTION

Figure 1:
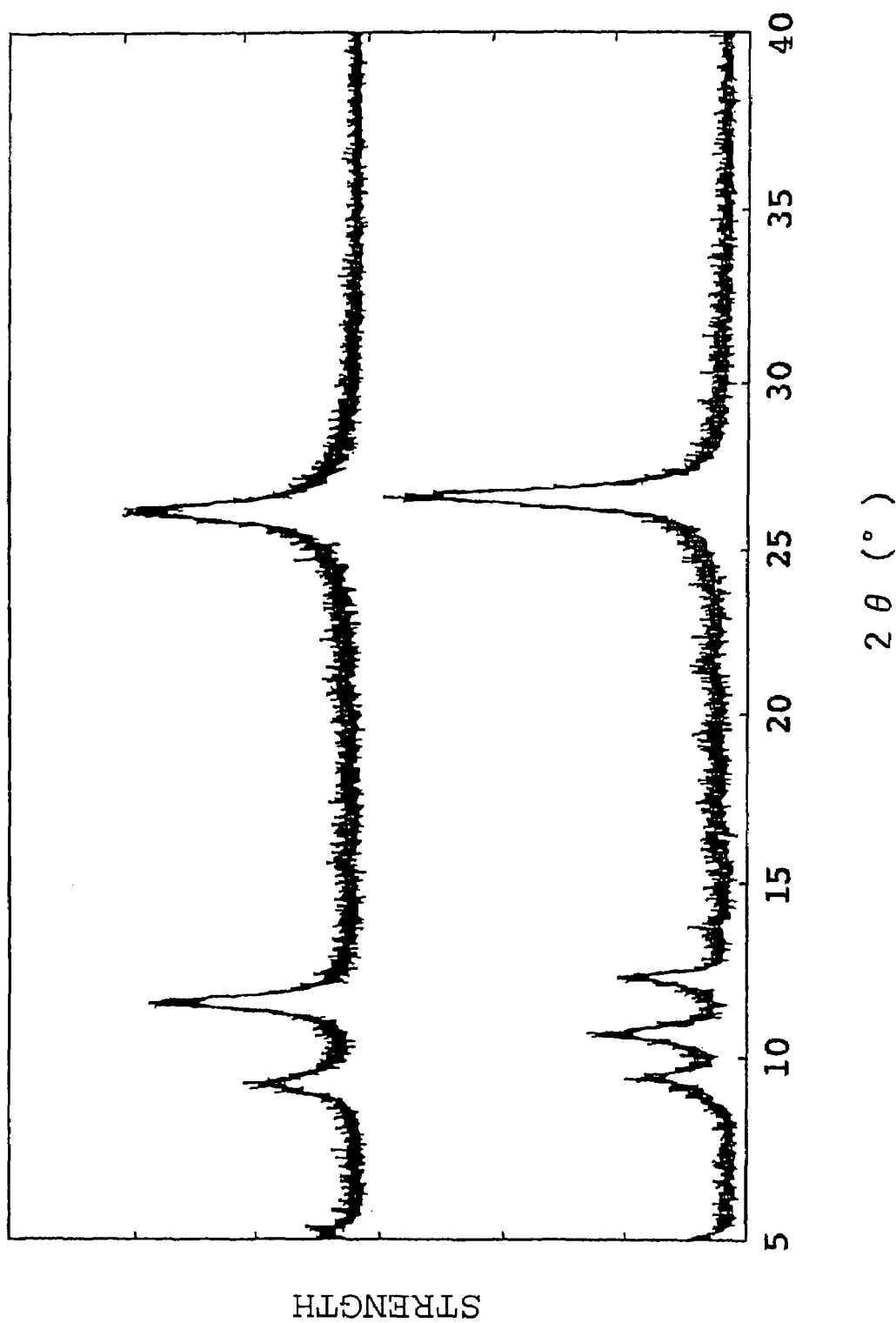
FIG. 1 is a graph showing an X-ray diffraction diagram of the black pigment obtained in Example 1.

The above object of the present invention can be accomplished by a black perylene-based pigment obtained by using calcining techniques which have not been conventionally used in the application field of organic pigments, and more specifically by calcining a specific perylene-based pigment at a specific temperature.

In an aspect of the present invention, there is provided a black perylene-based pigment produced by calcining at least one compound selected from the group consisting of compounds represented by the following formulae (I) to (III), at a temperature of 200 to 600° C. in vacuum or in an inert gas atmosphere.

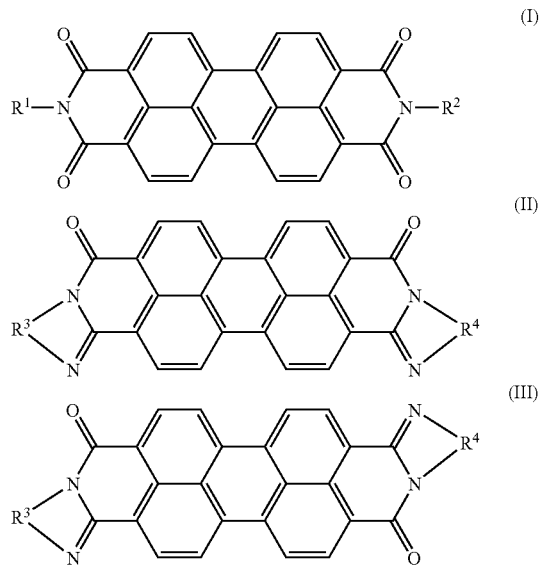

wherein $R^1$ and $R^2$ are identical to each other and are independently butyl group, phenylethyl group, methoxyethyl group and 4-methoxyphenylmethyl group; and $R^3$ and $R^4$ may be same or different and are independently phenylene group, alkylphenylene group, alkoxyphenylene group, hydroxyphenylene group, halogenated phenylene group, pyridinediyl group, alkylpyridinediyl group, alkoxypyridinediyl group, halogenated pyridinediyl group and naphthalenediyl group, the said $R^3$ and $R^4$ being bonded to adjacent positions of the aromatic ring, respectively.

In another aspect of the present invention, there is provided a process for producing a black perylene-based pigment, which comprises the step of calcining at least one compound selected from the group consisting of the compounds represented by the above formulae (I) to (III) at a temperature of 200 to 600° C. in vacuum or in an inert gas atmosphere.

The present invention is described in detail below. The black perylene-based pigment of the present invention is produced by calcining at least one compound selected from the group consisting of the compounds represented by the formulae (I) to (III) at a temperature of 200 to 600° C. in vacuum or in an inert gas atmosphere. The black perylene-based pigment obtained by the above calcining treatment can exhibit a good thermally stability and a suitable change in molecular arrangement from that of the raw compound. The thermal stability of the black perylene-based pigment can be confirmed as follows. That is, the hue values of the pigment heat-treated in an oven at 200° C. for one hour and the non-heat-treated pigment are measured, and a color difference (ΔE) therebetween is calculated from the measured values. In the case where the color difference (ΔE) is not more than 0.3, it is determined that the pigment has a good thermal stability. Also, the change in molecular arrangement can be confirmed by determining that the calcined pigment exhibits an X-ray diffraction pattern different from that of the non-calcined pigment.

Examples of the $R^1$ and $R^2$ groups of the compounds represented by the formula (I) may include butyl group, phenylethyl group, methoxyethyl group and 4-methoxyphenylmethyl group.

Examples of the preferred $R^3$ and $R^4$ groups of the compounds represented by the formulae (II) and (III) may include phenylene group, 3-methxoyphenylene group, 4-methoxyphenylene group, 4-ethoxyphenylene group, $C_1$ to $C_3$ alkylphenylene group, hydroxyphenylene group, 4,6-dimethylphenylene group, 3,5-dimethylphenylene group, 3-chlorophenylene group, 4-chlorophenylene group, 5-chlorophenylene group, 3-bromophenylene group, 4-bromophenylene group, 5-bromophenylene group, 3-fluorophenylene group, 4-fluorophenylene group, 5-fluorophenylene group, 2,3-pyridinediyl group, 3,4-pyridinediyl group, 4-methyl-2,3-pyridinediyl group, 5-methyl-2,3-pyridinediyl group, 6-methyl-2,3-pyridinediyl group, 5-methyl-3,4-pyridinediyl group, 4-methoxy-2,3-pyridinediyl group, 4-chloro-2,3-pyridinediyl group and naphthalenediyl group.

Among these $R^3$ and $R^4$ groups, more preferred are phenylene group, 2,3-pyridinediyl group and 3,4-pyridinediyl group.

Next, the process for producing the black perylene-based pigment according to the present invention is described below. According to the process of the present invention, at least one compound selected from the group consisting of the compounds represented by the formulae (I) to (III) is calcined in vacuum or in an inert gas atmosphere at a temperature of usually 200 to 600° C., preferably 450 to 550° C. for usually 0.5 to 2 hours, preferably 1 to 2 hours. As the inert gas, there may be used helium, argon or the like. The resultant calcined product is subjected to ordinary finishing treatments such as milling, thereby obtaining fine perylene-based pigment.

As described above, the fine perylene-based pigment is produced by calcining the perylene derivative. By conducting the calcining treatment at a temperature of 200 to 600° C., the obtained pigment can be increased in its blackness. The reason why the blackness of the pigment is increased by such a calcining treatment, is considered as follows. That is, according to Jin Mizuguchi, "Organic Pigments and Their Electron Structure", Journal of Japan Imaging Society, Vol. 37, pp. 256–257 (1998) relating to color change due to resonance interaction between excited molecules, the position and intensity of the absorption band considerably varies depending upon change in resonance interaction between excited molecules, which is caused by the change in molecular arrangement. Accordingly, it is considered that as a result of changing the molecular arrangement of the fine perylene-based pigment by conducting the calcining treatment at the above-specified temperature, the change in resonance interaction between excited molecules is caused, so that the fine perylene-based pigment shows an absorption band covering a whole visible light region, resulting in increased blackness thereof.

The thus obtained black perylene-based pigment exhibits an excellent blackness, an excellent heat resistance and an excellent weather fastness as well as a high electrical resistance and a high safety and, therefore, is useful as coloring pigments for inks, paints, ink-jet printing inks, electrophotographic toners, rubbers and plastics, and pigments for black matrix materials.

BEST MODE FOR CARRYING OUT THE INVENTION

The present invention is described in more detail by Examples, but the Examples are only illustrative and, therefore, not intended to limit the scope of the present invention.

(1) Blackness:

The blackness of the black perylene-based pigment was expressed by the ratio of a minimum value to a maximum value of an absorption band in a visible light region (refer to FIG. 2). When the ratio is not less than 0.55, the obtained black pigment showed a high blackness. The ratio of the minimum value to the maximum value of the absorption band is preferably not less than 0.65, more preferably not less than 0.75. The visible light absorption spectrum of a test specimen was measured by a spectrophotometer "UV-2400PC" (manufactured by SHIMADZU SEISAKUSHO CO., LTD.), thereby obtaining the minimum value and the maximum value of absorption band thereof. Meanwhile, the test specimen used for the measurement of the visible light absorption spectrum was prepared as follows. That is, 0.1 g of the black perylene-based pigment and 0.5 ml of castor oil were mixed together by a Hoover's muller to produce a paste. 4.5 g of clear lacquer was added to the obtained paste and was intimately kneaded to produce a paint. The obtained paint was applied on an OHP sheet by using a 1-mil applicator, thereby obtaining a coating film thereon.

(2) Tinctorial Strength:

The tinctorial strength, the weather fastness and the heat resistance of the black perylene-based pigment were evaluated by using L*, a* and b* values according to CIE space, i.e., uniform sensory color space of Commission Internationale de l'Eclairage (1976). The tinctorial strength was determined as follows. That is, the L* value of a specimen was measured by using a spectrocolorimeter "Color Guide" (manufactured by BYK-Gardner GmbH), and the visual reflectivity Y (%) was calculated from the measured L* value according to the following formula:

$$Y\ (\%) = L^{*2}/100$$

Further, the Munsell value V was obtained from the thus calculated visual reflectivity Y value by referring to Attached Table-2 of JIS-Z-8721.

The tinctorial strength (TS (%)) of a test specimen was calculated from the Munsell value (VA) of a control specimen and the Munsell value (VB) of the test specimen according to the following formula:

$$TS\ (\%) = \{1-(VB-VA)\} \times 100$$

The test specimen was prepared as follows. That is, 0.5 g of the black perylene-based pigment, 1.5 g of titanium oxide and 0.5 ml of castor oil were mixed together by a Hoover's muller to form a paste. 4.5 g of clear lacquer was added to the obtained paste and was intimately kneaded to form a paint. The obtained paint was applied on a cast-coated paper by using a 6-mil applicator, thereby obtaining a coating film thereon. The control specimen was prepared as follows. That is, 0.5 g of the black perylene-based pigment obtained in Comparative Example 1, 1.5 g of titanium dioxide and 0.5 ml of castor oil were mixed together by a Hoover's muller to form a paste. 4.5 g of clear lacquer was added to the obtained paste and was intimately kneaded to form a paint. The obtained paint was applied on a cast-coated paper by using a 6-mil applicator, thereby obtaining a coating film thereon.

(3) Weather Fastness:

The black perylene-based pigment particles were placed about 10 cm underneath an ultra-high pressure mercury lamp (500 W, manufactured by USHIO DENKI CO., LTD.) and irradiated with light therefrom for 8 hours. The thus irradiate-treated black perylene-based pigment particles as well as non-irradiate-treated black perylene-based pigment particles were used to prepare each of test specimens by the below-mentioned method. The L*, a* and b* values of the test specimens were measured, and the weather fastness of the black perylene-based pigment particles was expressed by the color difference (ΔE) calculated from the measured L*, a* and b* values according to the following formula:

$$\Delta E = \sqrt{(L_s^* - L^*)^2 + (a_s^* - a^*)^2 + (b_s^* - b^*)^2}$$

wherein $L_s^*$, $a_s^*$ and $b_s^*$ represent hue values of the non-treated black perylene-based pigment; and L*, a* and b* represent hue values of the treated black perylene-based pigment.

When the color difference (ΔE) is not more than 0.3, the obtained black perylene-based pigment was free from change in hue between before and after the treatment and, therefore, had an excellent weather fastness.

The test specimens were prepared as follows. That is, 0.5 g of the black perylene-based pigment and 0.5 ml of castor oil were mixed together by a Hoover's muller to form a paste. 4.5 g of clear lacquer was added to the obtained paste and was intimately kneaded to form a paint. The obtained paint was applied on a cast-coated paper by using a 6-mil applicator, thereby obtaining a coating film thereon.

(4) Heat Resistance:

The heat resistance of the black perylene-based pigment was measured as follows. That is, the hue values of the black perylene-based pigment heat-treated in an oven at 200° C. for one hour as well as those of the non-heat-treated black perylene-based pigment were respectively measured, and the heat resistance of the black perylene-based pigment was expressed by the color difference (ΔE) by the same method as used in the above evaluation of the weather fastness.

(5) Electrical Resistance:

The electrical resistance of the black perylene-based pigment was expressed by the volume resistivity value thereof as measured by the following method. First, 0.5 g of the black perylene-based pigment was weighed and then molded under a pressure of 140 kg/cm² to form a test specimen. The thus prepared test specimen was set between a pair of stainless steel electrodes completely isolated from outside by a Teflon holder. The test specimen was applied with a voltage of 15 V by using a Wheastone bridge ("TYPE 2768" manufactured by YOKOGAWA DENKI CO., LTD.) to measure a resistance value (R) thereof. After the measurement, an electrode area A (cm²) and a thickness t (cm) of the test specimen were measured, and the volume resistivity value X (Ω·cm) thereof was calculated from the measured values according to the following formula:

$$X = R/(A/t)$$

EXAMPLE 1

The compound represented by the formula (I) wherein $R^1$ and $R^2$ both are butyl group, was heat-treated at 500° C. for one hour in an argon gas atmosphere in a cylindrical heating furnace. The resultant product was pulverized by a ball mill, thereby obtaining a black pigment.

As a result of measuring the X-ray diffraction diagram of the obtained black pigment, as shown in FIG. 1, there was observed the diffraction diagram (as shown in an upper part of FIG. 1), which was different from the diffraction diagram (as shown in a lower part of FIG. 1) of the starting compound. Therefore, it was conformed that the molecular arrangement of the obtained black pigment was changed from that of the starting compound. Also, as a result of measuring the light absorption spectrum of the obtained black pigment, as shown in FIG. 2, there was observed the absorption spectrum (indicated by the solid line in FIG. 2) exhibiting a broad absorption band covering a still broader visible light region as compared to the absorption spectrum of the black pigment used as the starting material (indicated by the dotted line in FIG. 2).

Further, when the obtained black pigment was heat-treated at 200° C. for one hour, the color difference (ΔE) was not more than 0.3, and no change in quality thereof was caused. Also, when the black pigment was irradiated with light for 8 hours using an ultra-high pressure mercury lamp, no change in hue thereof between before and after the irradiation was observed. As a result, it was confirmed that the black pigment had an excellent heat resistance and an excellent weather fastness. Essential production conditions are shown in Table 1, and various properties of the obtained black pigment are shown in Table 2.

EXAMPLE 2

The same procedure as defined in Example 1 was conducted except that the compound represented by the formula (I) was replaced with the compound represented by the formula (II) wherein $R^1$ and $R^2$ both are phenylene group, thereby producing a black pigment. Essential production conditions are shown in Table 1, and various properties of the obtained black pigment are shown in Table 2. As a result of measuring the X-ray diffraction diagram of the obtained black pigment, there was observed the diffraction diagram different from that of the starting material. Therefore, it was confirmed that the molecular arrangement of the obtained black pigment was changed from that of the starting material. Also, as a result of measuring the heat resistance, it was confirmed that the obtained black pigment was thermally stable.

COMPARATIVE EXAMPLE 1

The compound represented by the formula (I) wherein $R^1$ and $R^2$ both are butyl group, was heat-treated in an oven at 200° C. for one hour. The hue values of the thus heat-treated black perylene-based pigment and the non-heat-treated black perylene-based pigment were measured to calculate a color difference (ΔE) therebetween. As a result, it was confirmed that the color difference (ΔE) was 1.9 and, therefore, the obtained black perylene-based pigment was thermally unstable.

TABLE 1

| Examples and Comparative Examples | Preparation conditions | | Calcining conditions | |
|---|---|---|---|---|
| | Compound used | Substituents | Temperature (° C.) | Atmosphere |
| Example 1 | Compound of formula (I) | $R^1$ and $R^2$: butyl group | 500 | Argon |
| Example 2 | Compound of formula (II) | $R^3$ and $R^4$: phenylene group | 500 | Argon |
| Comparative Example 1 | Compound of formula (I) | $R^1$ and $R^2$: butyl group | — | — |

TABLE 2

| Examples and Comparative Examples | Properties of pigment | | | | |
|---|---|---|---|---|---|
| | Blackness ($OD_{min}/OD_{max}$) | Tinctorial strength (%) | Volume resistivity value ($\Omega \cdot cm$) | Weather fastness ($\Delta E$) | Heat resistance ($\Delta E$) |
| Example 1 | 0.57 | 105 | $10^{11}$ | <0.3 | <0.3 |
| Example 2 | 0.75 | 113 | $10^{11}$ | <0.3 | <0.3 |
| Comparative Example 1 | 0.57 | 102 | $10^{11}$ | 1.3 | 1.9 |

INDUSTRIAL APPLICABILITY

As described above, the black perylene-based pigment according to the present invention is a black pigment whose molecule is re-arranged into a stable phase by heat-treatment, and exhibits an excellent blackness, an excellent heat resistance and an excellent weather fastness as well as a high electrical resistance and a high safety. Therefore, the black perylene-based pigment is useful as pigments for inks, paints, ink-jet printing inks, electrophotographic toners, rubbers and plastics as well as black matrix materials.

Also, the black perylene-based pigment of the present invention is extremely thermally stable, and is completely free from change in color tone thereof. In addition, since the black perylene-based pigment shows no absorption band in near-infrared and infrared regions, a coating film containing such a black perylene-based pigment has an extremely high reflectivity in near-infrared and infrared regions. In particular, a polyvinyl chloride-based or polyethylene-based coating film containing the black perylene-based pigment is inhibited from suffering from temperature rise even when exposed to sunlight irradiation, resulting in prolonged life of the coating film.

What is claimed is:

1. A process for producing a black perylene-based pigment comprising calcining at least one compound selected from the group consisting of compounds represented by the following formulae (I) to (III), at a temperature of 200 to 600° C. in vacuum or in an inert gas atmosphere

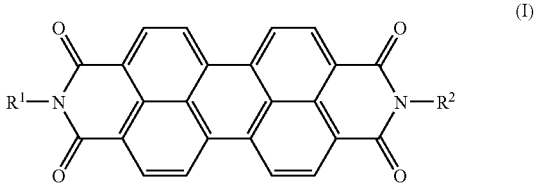

(I)

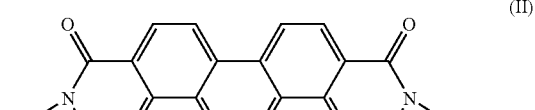

(II)

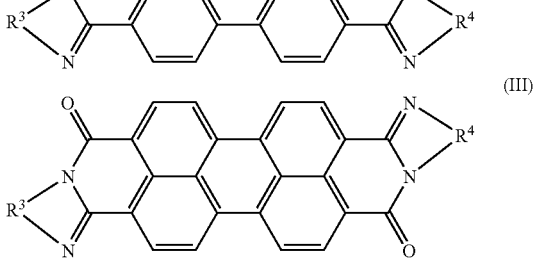

(III)

wherein $R^1$ and $R^2$ are identical to each other and are independently a butyl group, phenylethyl group, methoxyethyl group and 4-methoxyphenylmethyl group; and $R^3$ and $R^4$ which may be same or different are independently a phenylene group, alkylphenylene group, alkoxyphenylene group, hydroxyphenylene group, halogenated phenylene group, pyridinediyl group, alkylpyridinediyl group, alkoxypyridinediyl group, halogenated pyridinediyl group and naphthalenediyl group.

2. A black perylene-based pigment produced by the process of claim 1.

* * * * *